US00RE43855E

(19) United States
(12) Reissued Patent
Hill et al.

(10) Patent Number: US RE43,855 E
(45) Date of Reissued Patent: Dec. 11, 2012

(54) PRINTING WITH DIFFERENTIAL ADHESION

(75) Inventors: G. Roland Hill, Stockport (GB); Chris David Parry, Farnham Common (GB)

(73) Assignee: Contra Vision Ltd., Stockport (GB)

(21) Appl. No.: 11/716,727

(22) Filed: Mar. 12, 2007

Related U.S. Patent Documents

Reissue of:
(64) Patent No.: 6,899,775
Issued: May 31, 2005
Appl. No.: 10/349,169
Filed: Jan. 23, 2003

U.S. Applications:
(60) Provisional application No. 60/350,018, filed on Jan. 23, 2002.

(51) Int. Cl.
*C08J 7/04* (2006.01)

(52) U.S. Cl. ..... 427/511; 427/261; 427/264; 427/265; 427/348; 427/355; 427/533; 427/271; 427/299; 427/331; 427/369

(58) Field of Classification Search ..... 428/195.1, 428/187; 156/344; 427/492, 261, 264, 365, 427/348, 355, 511, 533, 271, 299, 331, 369
See application file for complete search history.

(56) References Cited

U.S. PATENT DOCUMENTS

| | | | | | |
|---|---|---|---|---|---|
| 3,747,202 | A | * | 7/1973 | Jordan | 438/125 |
| 4,673,609 | A | * | 6/1987 | Hill | 428/187 |
| 4,925,705 | A | * | 5/1990 | Hill | 427/259 |
| 5,494,707 | A | * | 2/1996 | Wang et al. | 427/412.1 |
| 5,609,938 | A | * | 3/1997 | Shields | 428/138 |
| 6,093,275 | A | * | 7/2000 | Hinson, II | 156/248 |
| 6,102,536 | A | * | 8/2000 | Jennel | 347/100 |
| 6,210,776 | B1 | * | 4/2001 | Hill | 428/187 |
| RE37,186 | E | * | 5/2001 | Hill | 428/187 |
| 6,267,052 | B1 | * | 7/2001 | Hill et al. | 101/211 |
| 6,326,419 | B1 | * | 12/2001 | Smith | 523/160 |
| 6,552,820 | B1 | * | 4/2003 | Hill | 358/1.8 |
| 6,824,639 | B1 | * | 11/2004 | Hill et al. | 156/230 |
| 6,899,775 | B2 | | 5/2005 | Hill et al. | |

FOREIGN PATENT DOCUMENTS

| | | | | |
|---|---|---|---|---|
| EP | 0540203 | A1 | | 5/1993 |
| EP | 0 540 203 | B2 | | 10/2001 |
| GB | 2 118 096 | A | | 2/1984 |
| GB | 2118096 | A | | 2/1984 |
| GB | 2165292 | A | * | 4/1986 |
| WO | 9747481 | A1 | | 12/1997 |
| WO | WO98/17480 | A1 | * | 4/1998 |
| WO | WO 9907796 | A1 | * | 2/1999 |
| WO | 0046043 | A1 | | 8/2000 |
| WO | WO 00/46043 | | | 8/2000 |

* cited by examiner

*Primary Examiner* — Gerard Higgins
(74) *Attorney, Agent, or Firm* — Pillsbury Winthrop Shaw Pittman LLP

(57) ABSTRACT

This invention relates to the printing of a substrate having a pre-printed "print pattern" with a "design layer" of ink where there is differential adhesion within and without the print pattern. The print pattern is receptive to an ink, and the design layer ink forms a durable image material with good bond to the print pattern, but the ink does not form a durable image material on the portions of the substrate outside the print pattern. The design layer ink is a UV-curable ink, and the print pattern may have a higher surface energy than the portions of the substrate outside the print pattern.

36 Claims, 11 Drawing Sheets

10

5
6
14
20
10

11a
14
20
10

11
14
18
10

11
6
14
10

11
12
6
14
10

Fig.4A
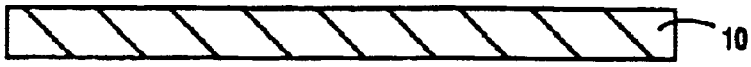
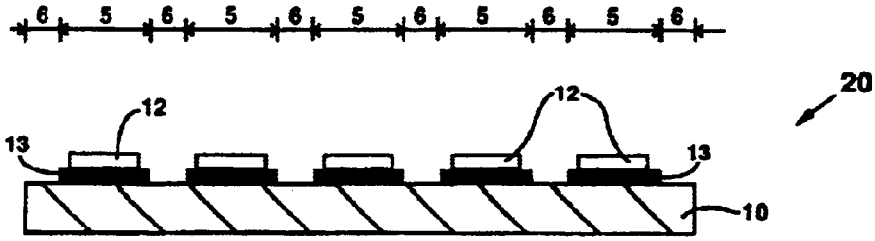
Fig.4B
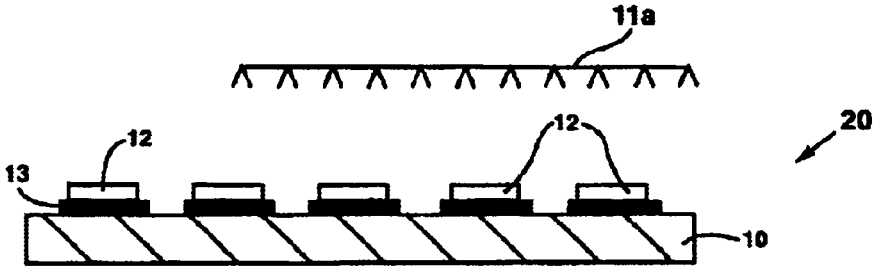
Fig.4C
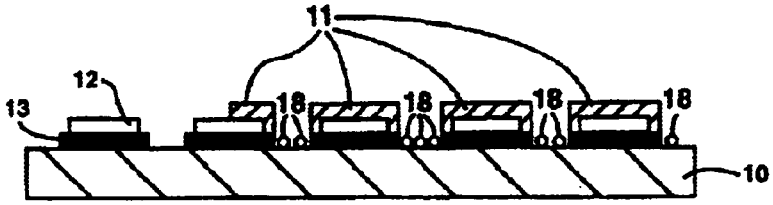
Fig.4D
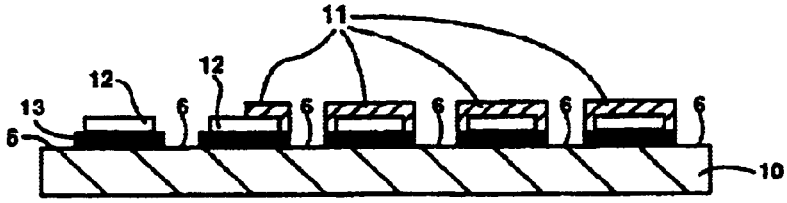
Fig.4E

PRINTING WITH DIFFERENTIAL ADHESION

Matter enclosed in heavy brackets [ ] appears in the original patent but forms no part of this reissue specification; matter printed in italics indicates the additions made by reissue.

This Application is based on Provisional Application No. 60/350,018 filed Jan. 23, 2002, the entire contents of which is hereby incorporated by reference.

FIELD OF THE INVENTION

This invention relates to the printing of a substrate having a pre-printed "print pattern" with a "design layer" of ink with differential adhesion within and without the print pattern.

BACKGROUND OF THE INVENTION

GB 2 118 096 (Hill and Yule), U.S. Re. Pat. No. 37,186 (Hill) reissued from U.S. Pat. No. 4,673,609 and U.S. Pat. No. 4,925,705 (Hill) describe methods of printing with exact registration, in which layers of cured ink are removed from areas of a substrate to leave exactly superimposed layers of ink on the remaining areas of the substrate. Methods referred to in these patents as the "direct" and "stencil" methods require an "ink fracture mechanism" to be formed around the desired "silhouette pattern" or "print pattern", typically of dots or lines. UV-curing ink is not disclosed in these patents, and typical UV-curing screenprinting ink has been found to be unsuitable for these methods. That is because the "chemical cross-linking" which occurs upon UV-curing creates a "membrane strength" or tensile capability in the cured ink layer(s) which prevents ink fracture or which prevents a "clean" ink fracture along the desired boundary of each area of the print pattern. Thus, any resultant fracture is irregular and inaccurate, with ink 'flaps' projecting into areas outside the desired or intended print pattern.

U.S. Pat. No. 6,267,052 "Printing with Differential Receptivity" (Hill and Godden), discloses methods of printing with lack of registration and printing with exact registration, together with seven methods of exactly superimposing an image "design layer" onto a pre-printed "print pattern" which partially covers a substrate. One of those seven methods is Method 3, "Conventional Printed Ink or Digital Ink Jet Differential Adhesion Method." According to Method 3, the ink adheres to the print pattern to form a durable image material but does not form a durable image material on the unprinted portions of the substrate. That method can be used for a variety of purposes, including manufacturing one-way vision panels according to U.S. Re. 37,186 or other products in which areas of the substrate are required to be printed with exactly superimposed layers of ink. U.S. Pat. No. 6,267,052 discloses alternative inks that are suitable for forming a "design layer" by means of Method 3, including water-based inks, catalytic inks, and solvent-based inks. UV-curable inks are not disclosed in that patent, and UV-curable inks are believed never to have been disclosed or used in connection with Method 3. U.S. Pat. No. 6,267,052 also discloses the use of self-adhesive vinyl stripes to form a "print pattern", and applying an "application tape" or "overlaminate" to imaged vinyl stripes to enable their application to a window.

U.S. Pat. No. 6,210,776 discloses what is referred to as the "Through Combination" method of managing the normal lack of registration in the printing of superimposed layers which can arise when making panels. UV-curing screen ink has been used to make such panels according to Method 3 under the trademark Overlap Registration System™, the panels being sold under the trademark Contra Vision SCREENLINE™, both trademarks being owned by Contra Vision Ltd, a UK company. The Through Combination method does not utilize differential receptivity or differential adhesion or removal of unwanted ink.

SUMMARY OF THE INVENTION

According to the present invention, a method is disclosed for making a printed panel having a design printed thereon, with the design including a durable image material design layer. The method includes 1) forming a print pattern onto a substantially imperforate substrate to form a patterned substrate, with the print pattern subdividing the substrate into a plurality of discrete printed areas and/or a plurality of discrete non-printed areas; and 2) presenting a design-generating medium to the patterned substrate to form an imaged substrate without regard to whether the design-generating medium is being presented to the areas of the print pattern or to the areas outside the print pattern. The design-generating medium causes the durable image material design layer to be formed only within the print pattern but not outside the print pattern, and the design-generating medium causes either (i) no image material to be formed on the areas outside the print pattern or (ii) only non-durable image material to be formed on the areas outside the print pattern. The durable image material design layer is formed from UV-curable ink. Non-durable image material is defined as material which can be substantially removed by water-jetting at a pressure not greater than 2,000 lb/in$^2$ (140 kg/cm$^2$) with a water flow rate of not greater than 15 liters/minute, and any durable image material having good adhesion to the substrate will remain substantially not removed by water-jetting at a pressure not greater than 2,000 lb/in$^2$ (140 kg/cm$^2$) with a water flow rate of not greater than 15 liters/minute.

In all applications of the method of the invention, only part of the substrate, termed the "print pattern" is durably imaged. The "print pattern" includes a plurality of discrete printed areas and/or interconnected areas surrounding a plurality of discrete non-printed areas. Examples of print patterns include a pattern of dots or lines or a grid, net or filigree pattern. The print pattern includes a single layer of marking material or a plurality of layers of marking material. In a preferred embodiment, the print pattern includes layers of ink printed in substantially exact registration. The print pattern ink is typically solvent-based ink that is applied, for example, according to U.S. Re. No. 37,186 or U.S. Pat. No. 4,925,705, UV-cured ink; epoxy-based ink; or water-based ink. The print pattern may include varied, sequential layers, with the first layer having good adhesion to the substrate, the subsequent layer or layers having good adhesion to the previous layer and the top layer providing good adhesion to the design layer. If the print pattern is desired to be receptive to those inks or other imaging materials that are designed and formulated to be applied to polyvinyl chloride materials, the final layer of the print pattern (if several layers are used) typically is an ink that has a surface with vinyl-like properties, such as Coates Vynalam™, an ink made by Coates Screen plc, a UK company. The print pattern can be of any color or combination of colors, or it may be a water-clear transparent layer or layers or a translucent layer or layers.

As used herein, the term "design layer" refers to a layer of material that is applied to a previously formed "print pattern"

by presenting an "addressed design" to the substrate using a "design-generating medium." The design layer can be a single layer of a single material, such as a single layer of ink, or it can be a multi-color printing process layer, in which individual color deposits (typically of black, cyan, magenta and yellow) are typically discontinuous within the design layer and any "printed portion" within the design layer.

In a preferred application of the invention, a UV-curable ink design layer is digitally printed onto a substrate having a pre-printed print pattern on it. Any UV-curable ink which does not form a durable image material is removed, for example by suction; by air-jetting; by jetting with a liquid (for example, water, but preferably a non-aqueous liquid); or by the application and removal of a layer which adheres to the surface of any ink or other marking material applied to the substrate but which only removes any non-durable image material, thus leaving the durable image material on the substrate within the desired print pattern. *This may include the use of a liquid layer which cures to adhere to the surface of the image material to form an adhered layer, which adhered layer is subsequently removed together with said non-durable image material attached to said adhered layer.*

As used herein, a "substrate" may be a single sheet of homogeneous material or a multi-layer material or assembly, for example incorporating the overall application of a coating to promote or inhibit the adhesion of a subsequently applied ink layer. The substrate is substantially imperforate but, for example, may comprise holes that may be used to assist printing registration or to feed the substrate through a printing or other machine.

In all embodiments of panels produced by the method of the invention, it is possible to take a particular cross-section through the panel, which cross-section includes the substrate having two outer edges and the print pattern having a plurality of alternate "printed portions" and "unprinted portions," with each printed portion having two outer edges. At least one of, and typically all of, the printed portions includes a "background color layer" of one material, for example printed ink, which extends over all but not outside the print pattern. The background color layer may be a first layer applied to the substrate, which forms and defines the "print pattern." At least two of the printed portions include a portion or more of the "design layer" of imaging material, which typically overlies or underlies the "background color layer." A "design" is the visible image of one or more "design layers," typically seen superimposed in front of a background color layer. Within the particular cross-section, a design layer has two outer boundaries and within the two outer boundaries each printed portion of the design layer is constructed to have two outer edges of a part of the design layer lying within the two outer edges of the printed portion. This configuration includes the possible arrangements of the two outer edges of a part of the design layer being spaced within the two outer edges of a printed portion or one outer edge of a part of the design layer being coterminous with an outer edge of a printed portion or the two outer edges of both the part of the design layer and the printed portion being coterminous. In the particular cross-section, at least one design layer is applied to at least two printed portions of the print pattern separated by at least one unprinted portion of the substrate. The design layer may extend over the entirety of the print pattern and typically does so in the case of a uniform color design or an overall multi-color process design.

A "design color layer" is a material of one color, of substantially uniform hue, graytone and intensity, within a design layer. The term "design color layer" includes one of the individual colors of a multi-color printing process, such as black, magenta, cyan and yellow. A design color layer does not extend over the entire print pattern.

A "durable image material" is an image material that is in a durable, substantially fixed chemical and solid state in a fixed geometrical relationship to the substrate, and has good adhesion to the substrate. For the avoidance of doubt, a cured ink layer falling outside the "silhouette pattern" as in the prior art methods of U.S. Re. No. 37,186 and outside the "print pattern" as in the prior art methods of U.S. Pat. No. 4,925,705 is deemed to be in a durable, substantially fixed chemical and solid state, in a fixed geometrical relationship to the substrate, thus requiring an ink fracture mechanism to remove it from the ink within the "silhouette pattern" or the "print pattern" of those methods, respectively. It does not, however, have good adhesion to the substrate due to the presence of a stencil or other layer applied to and with poor adhesion to the substrate. These prior art methods require a substantial force to cause an ink fracture mechanism to substantially remove unwanted cured ink, the substantial force being provided, for example, by high-pressure water-jetting, typically with a pressure of not less than 1,500 lb/in$^2$ (105 kg/cm$^2$) and typically over 2,000 lb/in$^2$ (140 kg/cm$^2$) with a rate of water flow of not less than 10 liters/minute and typically 15 liters/minute or 15 kg/minute.

As used herein, "non-durable image material" can be substantially removed by water-jetting at a pressure of 2,000 lb/in$^2$ with a rate of water flow of 15 liters/minute and any durable image material with good adhesion to the substrate will remain substantially not removed by water-jetting at a pressure of 2,000 lb/in$^2$ with a rate of water flow of 15 liters/minute. The present method preferably allows the removal of non-durable image material by an abrading medium under pressure, preferably air jetting or other method that does not leave an aqueous residue, preferably at a rate of less than 10 kg/minute and preferably less than 5 kg/minute and more preferably less than 2 kg/minute.

The method of the invention typically entails (i) the application of a design layer to a patterned substrate comprising a pre-printed print pattern with good adhesion to the substrate and with no image material outside the areas of the print pattern; or (ii) the application of a design layer to a patterned substrate comprising a pre-printed print pattern with good adhesion to the substrate and "non-durable image material" having poor adhesion to the areas of the substrate outside the print pattern. In this case (ii), the poor adhesion to the substrate outside the print pattern is provided, for example, by virtue of a stencil layer or other layer with poor adhesion to the substrate, for example in a manner similar to the "stencil" or "direct" methods disclosed in U.S. Re. Pat. No. 37,186.

In the case (i), the surface of the print pattern typically has a greater surface energy than the surface of the unprinted substrate and the design layer, typically of UV-curable ink, adheres better to the print pattern than to non-printed portions of the substrate. For example, the print pattern external surface typically has a surface energy of at least 40 dynes/cm$^2$ and preferably greater than 45 dynes/cm$^2$, whereas the non-printed areas of the substrate typically have a surface energy of less than 40 dynes/cm$^2$ and preferably less than 35 dynes/cm$^2$, where the substrate is, for example, polyester film that has not been treated to raise the surface energy above such level.

The surface energy of the substrate may be adjusted to create or enhance differential surface energy and thereby differential adhesion of image material.

In either cases (i) or (ii), a design layer formed from UV-curable ink is typically screenprinted or inkjet-printed. The method need not involve printing with substantially different ink systems, for example all the layers of ink may be UV-cured.

As used herein, the term "addressed design" means a geometrical layout that is independent of the print pattern, that extends both within boundaries of the print pattern and outside boundaries of the print pattern, and that defines the extent of a design layer within the print pattern. An addressed design may encompass a single design color layer or a multi-color process, including a four-color or a hexachrome process. An addressed design may be formed by a plurality of digitally addressed micro-elements, e.g., as part of a "digital printing method." The addressed design may cover all areas within and outside the print pattern, to produce a uniform color design layer or an overall multicolor process design layer, or it may only cover part of the print pattern.

As used herein, the terms "presenting an addressed design" and "presenting a design-generating medium" refer inclusively to the physical application of a layer of image material (for example, a printing ink by screenprinting or digital inkjet printing, thermal transfer resin, toner, dye or other image material) to the substrate or a previously applied layer or to the presentation of such materials in a spaced relationship to the substrate (for example, to be attracted by electrostatic charge within the printed portions of the substrate); or to the application of energy to convert image material on the substrate, e.g., by exposing the image material to a digital laser light source to convert photosensitive material to form a visible image.

As used herein, the term "digital printing methods" includes those processes grouped under the categories of Electrostatic, Electrographic, Thermal Transfer (sometimes referred to as Thermal Mass Transfer) and Thermal Dye Sublimation, and inkjet digital printing. Digital printing methods typically use a Raster Image Processor to control the position and size of deposits of black, cyan, magenta and yellow material in a four-color process and/or additional 'spot colors.' A 'spot color' has a substantially uniform hue, graytone and intensity. In such digital printing methods, very small deposits of an individual color of marking material are addressable to the surface of a substrate, for example, a deposit of pigmented resin foil by an individual node of a transfer head of a thermal foil transfer machine such as the Gerber Edge™ (a trademark of Gerber Scientific Products, Inc., USA) or the individual deposit resulting from a single impulse of a single inkjet of an inkjet printing machine. The method of the invention encompasses any method of digital printing in which small elements of marking material or energy are individually addressable to a substrate or addressable to a transfer carrier or a transfer drum that is then addressed to a substrate.

The invention can also be used in connection with producing one-way vision panels according to the "Through Combination" method disclosed in U.S. Pat. No. 6,210,776 (Hill). According to that method, superimposed layers of the print pattern are printed such that in each printed portion, one layer, typically a white layer, is spaced within another layer, typically a black layer. A translucent design layer typically extends outside the narrower, typically white layer but within the wider, typically black layer. The translucent design layer is seen against the white layer but is substantially invisible where it is directly applied to the black layer. Such print patterns with superimposed layers not in exact registration are typically more economic to produce than print patterns with superimposed layers in exact registration.

In a first method of adjusting the substrate surface energy, a substrate such as a PVC film, polyester film, polyethylene film, or polypropylene film is treated to increase its surface energy, for example by a corona treatment, to enable or improve the printing of the print pattern. Corona treatment promotes the adhesion of and enhances the keying and wetting-out of printing inks. It entails applying an electrical discharge to the surface being treated. Atmospheric oxygen molecules break down and bond to molecules in the material being treated, thus increasing the surface energy. The amount by which the surface energy of the substrate has been increased dissipates over time according to a decay curve. For example, over 2 dynes/cm$^2$ surface energy may be dissipated in less than 24 hours.

According to the method, a substrate is corona treated to raise the surface energy above 40 dynes/cm$^2$ and preferably above 45 dynes/cm$^2$. The print pattern is then applied by any suitable technique, such as screenprinting solvent based PVC ink. The pre-printed, patterned substrate is left for a time sufficient for the substrate surface energy to fall below a predetermined level, typically less than 40 dynes/cm$^2$ and preferably less than 35 dynes/cm$^2$, such that a subsequently applied design layer, typically of UV ink, does not form a durable image material on the substrate but does form a durable image material on the print pattern. The surface energy can be monitored by several means, including "dyne pens" of different gradings, such that when the ink from a dynes pen fails to "wet out" but forms into globules, the surface energy is less than the grading of the particular "dyne pen."

Alternative adhesion-promoting systems, the effects of which also decay over time, may be applied to the substrate surface before the printing of the print pattern. For example, flame plasma surface treatment can be used to increase the surface energy of the substrate, which then decays with time after the printing of the print pattern, to create the differential adhesion of the later applied design layer.

In a second method of adjusting substrate surface energy, a substrate such as a polyester film or polycarbonate film is treated by the application of a UV-curable, clear transparent coating that is only partially cured during the coating process to enable printing of the substrate. Suitable coatings are those which, after subsequent UV-curing, provide a scratch-resistant and/or vandal-resistant surface, which have a low surface energy, and which are difficult to print on. Examples of suitable UV-curing lacquers are Nor-Cote IGI or Nor-Cote MSK (products manufactured by Nor-Cote, Inc.), which may be applied to polyester or polycarbonate film. Examples of proprietary, coated substrates that satisfy this requirement are:

| | |
|---|---|
| Lexan ® HPxxS | (polycarbonate film base) |
| Marnot XL polycarbonate | (polycarbonate film base) |
| Marnot XL Melinex ® film | (polyester film base) |
| Autoflex ® EB | (polyester film base) |
| Autoflex ® PC | (polycarbonate film base) |

"Lexan" is a registered trademark of GE Plastics.
"Marnot" is a trademark of the Tekra Corporation.
"Autoflex" is a registered trademark of Autotype International Ltd.
"Melinex film" is a registered trademark of DuPont-Tiejin Films.

The partially cured UV coatings on those substrates enable the print pattern to be applied using UV-curable inks, varnishes or other UV-cured materials. The print pattern is also only partially UV-cured. However, during the partial UV-curing of the print pattern, the exposed portions of the initial transparent coating, which are not covered by the print pattern, are substantially fully cured. The time and intensity of the required UV radiation to both partially cure the print pattern and substantially fully cure the exposed coating are variable and depend upon the specific coated substrate being used, the transparent coating, the print pattern ink, and the thickness of the superimposed layers. The UV radiation can be applied from one or both sides of the transparent substrate if the substrate is transparent to UV radiation. For example, Lexan® HPxxS can be imaged to form the print pattern by Nor-Cote IGI series ink and partially cured, for example by 300 mJ/pass. Being only partially cured, the print pattern will have a higher surface energy than the areas of the substantially fully cured coating outside the print pattern and will allow the adhesion of a subsequent design layer to form a durable image on the print pattern but not on the substantially fully cured coating outside the print pattern. The coating outside the print pattern, when substantially fully cured, will have a lower surface energy than the ink on the print pattern and will not allow the same level of adhesion of subsequently applied ink, which thus forms a non-durable image material. The non-durable image material is then substantially removed by, for example, the application of an abrading medium such as air or water, or by the application of a suction force, or by the application and removal of an adhering surface, such as self-adhesive tape.

While the invention will typically utilize a print pattern printed by a conventional mass production process, such as screen, litho, or gravure printing, the print pattern can be printed digitally, e.g., with a white, white-on-black, or clear print pattern, for example, to produce one-way vision panels. The method of the invention is particularly beneficial for producing products with a non-standard print pattern from computer-generated artwork, e.g., for producing a stochastic, irregular silhouette pattern in products according to U.S. Re. Pat. No. 37,186. Such stochastic patterns have certain advantages over regular dot, line, hexagon or other such regular patterns, since defects in the print quality are not as easy to identify and fine, superimposed indicia are less likely to have edges falling between lines or regular rows of dots and thus be omitted from the finished product, a problem that typically limits the size of such indicia which can be incorporated into such products.

In addition to one-way vision products according to U.S. Re. Pat. No. 37,186, the method of the invention is useful for printing many other types of product. For example, most multi-color printing methods rely on a white substrate or surface on which to print. Therefore, if it is desired to print an image on one or more parts of a transparent substrate, it is typically desirable to first print a white layer and then the image (for example, a spot color indicium or a four-color process image). The present method enables exact alignment of a spot color or four-color process image with a pre-printed print pattern of white ink. Transparent substrates are also commonly reverse printed with a design so as to enable the right-reading design to be viewed through the substrate (and sometimes through a layer of self-adhesive and a window to which the substrate is applied). In such products, the print pattern is formed from a transparent material, for example, printed in clear transparent ink, and the design color layer ink is reverse printed, such that it forms a durable image material on the clear, transparent print pattern but such that it forms non-durable image material on the portions of the substrate outside the print pattern, typically followed by a white background color layer. Following removal of unwanted ink, the design can be seen "right reading" through the clear transparent substrate with the desired color rendering and in substantially exact registration with the white background layer.

In one example of the method, it is desired to print a sign (e.g. a product trademark) onto a transparent polycarbonate film using standard UV-cured inks that are typically printed onto a white background. Such standard UV-cured inks would not provide the desired color characteristics of hue, graytone, and intensity if printed directly onto the transparent film. Therefore, a printed underlayer of white is required to produce the desired color rendering. However, if the white then superimposed colored layer(s) forming the indicia were printed by conventional means, there would inevitably be lack of registration between the white and color layers. According to the invention, however, exact registration can be obtained by first coating the polycarbonate film with a transparent UV-curable coating such as clear, transparent Nor-Cote IGI, applied, for example, by means of floodcoat screen-printing and only partially curing this layer (for example, by 300 mJ/pass) so that it is receptive to a UV-curable white ink "print pattern" layer in the form of the desired indicia. This white layer is also partially UV-cured, but to the extent that the first transparent coating is then fully cured. For example, a suitable curing regime using white Nor-Cote IGI ink would be 300 mJ/pass. The partially cured white layer is then receptive to the one or more design color layers of the trademark indicia, which are printed so as to overlap the white areas and which are fully cured to adhere well to the white areas but not to the fully cured first transparent coating. The fully cured first transparent coating has a relatively low surface energy, thus enabling the unwanted ink outside the white print pattern to be subsequently removed by, for example, air or water-jetting, suction, or the application and removal of an adhering layer.

In another example of the method, the print pattern includes a plurality of layers of ink, for example, to produce one-way vision panels according to U.S. Re. Pat. No. 37,186, which typically have a black layer defining the silhouette pattern on the transparent coating, followed by one or more continuous "floodcoat" layers of white, followed by any design, printed in full, both over and outside the print pattern. All unwanted ink outside the print pattern is easily removed, layer-by-layer or all together, by virtue of the poor bond between the fully cured transparent coating and any layer subsequently applied. Typically it is removed by means of air or water-jetting, suction, or the application and removal of an adhering layer.

A third method of adjusting substrate surface energy, thereby fostering differential ink adhesion, entails applying a "hard coat" to a printable substrate, a technique customarily used to produce a panel that is more resistant to scratching, graffiti, etc. than the parent material is and that is therefore also difficult to print, having a low surface energy. One such proprietary material is Lexan® Margard® which is a polycarbonate material coated with a silicone based hard coat of surface energy less than 30 dynes/cm$^2$, and nominally of 28 dynes/cm$^2$. ("Lexan" and "Margard" are registered trademarks of GE Plastics). The low surface energy surface coating is removed from the areas of the print pattern (e.g., by chemical etching or laser cutting) to reveal a print-receptive surface (i.e., polycarbonate parent material) in the form of the print pattern. Subsequently applied layers of ink will adhere to the substrate within the print pattern but will not adhere outside the areas of the print pattern.

The design layer can be applied directly to the exposed substrate surface, for example a design layer of UV-curable ink by screenprinting or digital inkjet printing. Alternatively, one or more background layers of image material can first be applied, for example black and white UV-curable or solvent-based inks, before applying the design layer. The design layer of UV-curable ink is preferably applied by screenprinting or digital inkjet printing. Unwanted ink on the areas of the hard coat outside the areas of the print pattern can be removed layer-by-layer or after all the layers have been applied by, for example, air or water-jetting, suction, or the application and removal of an adhesive layer.

Advantageously, the UV-curable ink used for the design layer or layers should not "wet out" on exposed portions of the substrate but instead should form into droplets with relatively low surface contact with the substrate outside the printed portions. This feature will assist subsequent removal of the non-durable cured ink, which ideally is in the form of dry dust, e.g., by air-blowing or suction. Conventionally, the ink UV-cures simultaneously upon impact onto the substrate, the ink not having time to form into droplets but curing in its impacted configuration, the normal goal being to form a round dot with "build." However, with the present invention, a small time lag between impact and curing is advantageous to the formation of ink globules. This fosters the reduction of surface contact and the consequent reduction in any ink adhesion, thus facilitating removal of non-durable ink. The tendency of ink to form globules on a substrate is dependent on the surface tension between the ink and the substrate and the viscosity of the ink. Inkjet ink must have relatively low viscosity in order to pass through the fine inkjet nozzles of an inkjet printing machine. The ink viscosity is dependent upon temperature and, optionally, preheating of the ink and operating the digital inkjet machine at relatively higher temperature will tend to reduce the viscosity of the ink as it flows through the nozzles, enabling a higher viscosity ink to be used. *The ink may be preheated to a temperature not less than 25 degrees C.* Alternatively or additionally, it may be desirable to cool the ink upon egress from the inkjet nozzles, to yield a viscosity higher than that which would allow the ink to pass efficiently through the inkjet nozzles, thus facilitating the formation of droplets or globules of ink on the substrate. *The ink may be cooled before or upon contact with the substrate.* The surface tension of the UV-curable ink on a substrate, which determines how close to spherical the droplets form, may also be adjusted by adding a dewetting agent, such as a dispersion of PTFE or other fluorinating polymers.

The previously described variants of the method typically rely on the surface energy of the substrate outside the areas of the print pattern being lower than the surface energy within the print pattern. However, the method covers the use of any UV-curable ink presented by a design-generating medium to a patterned substrate, without regard to whether the design-generating medium is being presented to the areas of the print pattern or to the areas outside the print pattern, to form a durable image material design layer having good adhesion to the substrate within the print pattern but only non-durable image material without good adhesion to the substrate being formed on the areas outside the print pattern. This includes methods related to the "stencil" and "direct" methods of U.S. Re. Pat. No. 37,186 and U.S. Pat. No. 4,925,705 but with the use of a UV-curable ink for the design layer and, preferably, at least one further additional ink type to those disclosed and required by the prior art methods, as illustrated in FIGS. 9 and 10.

Printing with UV-curable inks has many environmental, processing speed, and other advantages over the prior art methods of printing with substantially exact registration, which have not utilized screenprinting UV ink systems because the strength of chemical cross-linking in UV ink systems typically prevents the creation of an "ink fracture mechanism" necessary to produce a clean edge to the "silhouette pattern" or "print pattern" of the prior art methods. UV ink changes from a liquid to a fracture-retarding, 100% solid state material that is chemically cross-linked when cured, whereas solvent ink comprises a relatively low percentage of solid particles (typically less than 20% solids) that are suspended in a solvent ink medium, the solvent components being substantially "driven off" during curing, so as to leave pigment ink particles with little or no fracture-hampering chemical bonds between them. Thus, one skilled in the art would not have considered [of] using a UV-curable ink for methods of printing with differential adhesion according to any aspect of the present invention, which requires selective removal of unwanted ink.

Recent developments in UV ink technology, however, have enabled UV inks to be used according to this invention to achieve substantially exact registration of superimposed layers. Such developments include the development of UV-curable ink for use in Piezoelectric-based digital inkjet printing machines, in which the ink must pass through inkjet nozzles that typically have diameters similar to that of a human hair, for example Uvijet™, a trademark of Sericol Imaging Ltd. Such inkjet-printable UV inks are typically 50 times "thinner" than typical UV-curable screenprinting inks. The required reduction in ink viscosity that is necessary to achieve this, and the oligomer (reactive resins), monomer (reactive diluents), and photoinitiator (UV light-absorbers) contents in particular, yield UV inks that fracture relatively easily as compared to standard screenprinting UV inks intended for acrylic, pvc, polycarbonate, print-treated polyester, and other common plastic substrates. A further important factor in the manufacture of recently developed UV inks which assists the method are pigment particle sizes of less than 1μ and as little as 30/1000 μ, instead of the 2 or 3 μ typical of conventional UV screen inks and the 5-10 μ typical of conventional solvent based screen inks. Such new capabilities enable the formulation of UV-curable inks with a wider range of properties including fracture characteristics, to suit the present method, for example Uvijet™. Such inks enable ink removal from the areas of the substrate outside the print pattern, by the methods previously described, thus leaving superimposed layers of ink in substantially exact registration in the form of the print pattern.

A still further advantage is in the "stencil" or "direct" variants of the invention. These typically use solvent ink to create the print pattern (solvent ink fractures easily along the intended boundaries of the print pattern areas) but use UV-curable ink for the design layer. Fracture of the solvent ink provides a stress concentration which initiates and helps to propagate a crack through the UV-cured ink layer. Fracture of a superimposed UV-cured ink layer takes place along the same boundaries as the underlying solvent ink layer or layers, in view of the bond of the UV-cured ink to the immediately underlying solvent ink layer and thereby all layers of solvent ink in the print pattern.

Unwanted non-durable image material may be removed from the portions of the substrate outside the areas of the print pattern by suction, by air-jetting or by jetting with an abrading medium comprising air and a particulate material. Unwanted non-durable image material can also be removed by an abrading fluid, for example, water, but preferably a non-aqueous fluid such as a solvent-based liquid (e.g., an alcohol-based fluid) from which the solvent evaporates after jetting (thus reducing or eliminating any residual free water on the substrate). Alternatively, the unwanted non-durable image material can be removed by adhesive means, for example, by applying and removing a self-adhesive film, by passing the imaged substrate against an adhesive-coated roller, by applying an adhered layer such as a plastisol ink or other material that can subsequently be removed, bringing with it the unwanted non-durable image material but not any substantial quantities of the durable image material applied to the print pattern or any substantial quantities of the print pattern itself. Still further, unwanted non-durable image material can be removed by wiping with a cloth, brushing or buffing with or without an abrading agent. Preferably, removal of the unwanted non-durable image material can be effected by suction or air-jetting alone, to minimize any abrasion of the design layer or layers and to avoid wetting the imaged substrate, as wetted substrates require an additional drying process.

The efficiency of removal of the unwanted non-durable image material by air-jetting is related to the air pressure and the nozzle shape and size, which control the mass of air impinging on a given surface area. Preferably, the energy required to remove the unwanted non-durable image material will be significantly less than that required by using the prior art water-jetting technique to create an ink fracture mechanism and remove unwanted ink according to the method of U.S. Pat. No. 4,925,705 or that required using water-jetting as in U.S. Pat. No. 6,267,052 at a rate of 10 liters/minute (equating to 10 kg/minute). The present method, for example with the design layer applied to silicone-based coating on the substrate outside the print pattern, allows removal by an abrasive medium at less than 10 kg/minute, preferably at less than 5 kg/minute and more preferably at less than 2 kg/minute.

The UV-curable ink design layer or layers are applied in the form of an "addressed design" either continuously or selectively, the latter reducing the amount of non-durable image material to be removed. For example, the design layer or layers can be applied to overlap a pre-printed print pattern but not to extend across the entirety of the non-printed portions of the substrate, for example by overlapping a print pattern of lines with slightly wider lines.

In panels manufactured according to the methods disclosed in U.S. Re. Pat. No. 37,186, the printed portions of the print pattern typically have an average width of less than 1 cm, preferably less than 6 mm and ideally less than 2 mm. The method of this invention facilitates the manufacture of such partially printed products with printed portions of relatively small width and with a plurality of layers in substantially exact registration. Thus the disadvantages of the otherwise inevitable lack of registration resulting from conventional screen, litho, digital and other printing methods are avoided.

The method is advantageous in that it facilitates a pre-printed substrate being sold to screenprinters or to digital inkjet printers as a part-processed material which is then converted by them to form durable image material on the print pattern with superimposed layers in substantially exact registration, to make, for example, one-way vision panels according to U.S. Re. Pat. No. 37,186.

Another advantage of the present method over the prior art is that the methods of ink removal by suction, air-jetting or use of an adhering surface are compatible with the operation of a typical inkjet printing company which, unlike a screenprinting company, would not otherwise have water-jetting facilities.

The optional use of "reversible" or ephemeral means of promoting ink adhesion such as corona treatment of the substrate prior to application of the print pattern, which treatment is subsequently reversed before the design layer is applied to the patterned substrate, provides another advance over the prior art in terms of promoting a more reliable means of differential adhesion of the design layer image material. Two-stage curing of a clear, transparent, UV-curable coating or the selective removal of a low surface energy "hard coat" over the areas of the print pattern also represent significant advances over the prior art.

The print pattern may be formed by means other than printing, for example cut stripes of [filmic material] *film* applied to a substrate. For example, self-adhesive vinyl stripes can be superimposed on a substrate having a much lower surface energy than the vinyl stripes (e.g., a silicone-coated polyester film) on which the UV-curable ink will cure in a form which can be easily removed (typically ink globules cured in the form of dust) a major advantage of this new method. A self-adhesive vinyl with a removable silicone-coated liner can be "kiss-cut" to form the self-adhesive stripes on the temporary liner. After applying the design layer, typically with UV-curable ink, a self-adhesive "application tape" may optionally be applied over the imaged stripes, to enable the temporary liner to be removed and the imaged stripes to be applied to a window, for example to produce a one-way vision sign. Optionally, the application tape would then be removed, leaving the self-adhesive stripes on the window. Alternatively, the application tape can be in the form of an overlaminate that remains on the self-adhesive vinyl stripes after their application to a window, for example to prevent the ingress of dirt between the stripes. If the bond of the overlaminate to the design layer on the stripes is greater than the bond of the self-adhesive (on the other side of the stripes) to the window, this facilitates subsequent removal of the stripes from the window, when the sign is no longer required. Removal of the overlaminate will remove the stripes with it, rather than the stripes being left on the window. However, the typically smooth, shiny and more durable nature of the surface of cured UV ink (normally an advantage over other types of ink) necessitates greater care in the selection of a suitable adhesive to enable the overlaminate to perform this function. For example, a high tack self-adhesive overlaminate which has a high bond to the UV-cured ink would be problematical if it comes into contact with the window surface, for example by someone pressing against the overlaminate. According to the present invention, an overlaminate with a heat activated adhesive is preferable to achieve a high bond to the imaged stripes but such an overlaminate will not subsequently adhere to a window, as the adhesive is not effective without heat. A suitable heat-activated overlaminate system is Thermashield E ™, a trademark of the Hunt Corporation.

To enhance the subsequent visibility of the design on a panel, the print pattern or a background color layer within the print pattern can be formed of retro-reflective or electroluminescent preformed or ink materials.

The method can also be used to make panels according to U.S. Pat. No. 6,612,805 (Hill), which are partially printed with a translucent print pattern and a translucent design, to facilitate the panels being rear illuminated. A translucent print pattern will typically be formed with translucent white ink followed by the design layer or layers of translucent UV-curing ink. Alternatively, the print pattern will be formed of clear ink or other material, followed by one or more translucent UV-curable ink design layers to form a reverse printed design, typically followed by a layer of UV-curable translucent white ink.

BRIEF DESCRIPTION OF THE DRAWINGS

The invention will now be described in more detail in connection with the drawings, in which:

FIGS. 1 to 4 (including FIGS. 1A-1E, 2A-2F, 3A-3E, and 4A-4E, respectively) each depict sequential diagrammatic panel cross-sections illustrating the production of products according to the methods of the present invention, in which FIG. 1 illustrates a print pattern consisting of a single layer of ink; FIG. 2 illustrates a print pattern consisting of a single layer of clear ink; FIG. 3 illustrates a print pattern consisting of exactly registered, white-on-black layers; FIG. 4 illustrates a print pattern consisting of printed portions comprising a white layer that is spaced within a black layer;

DETAILED DESCRIPTION OF PREFERRED EMBODIMENTS

Figure 1A:
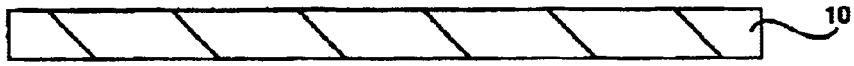
Figure 1B:
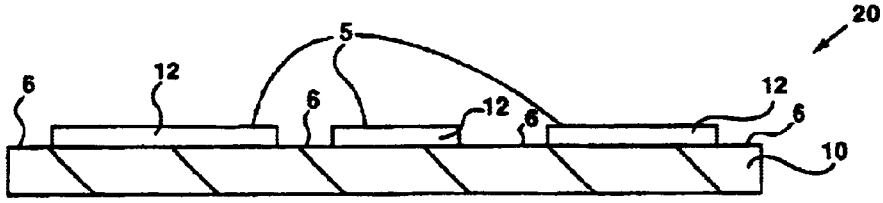
Figure 1C:
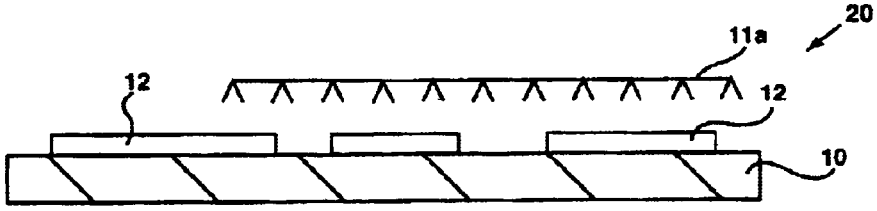
Figure 1D:
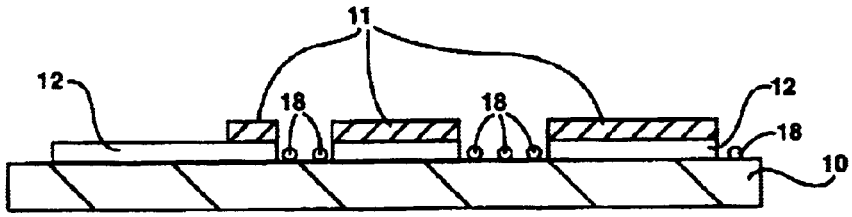
Figure 1E:
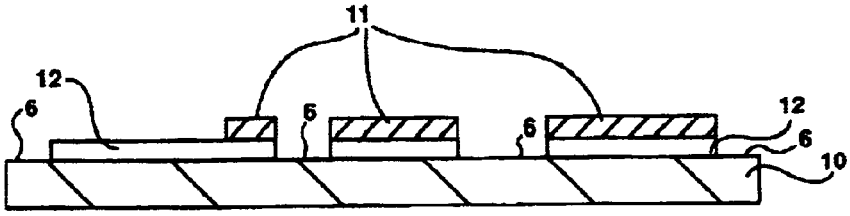
Figures 2A, 2B, 2C, 2D, 2E, 2F:
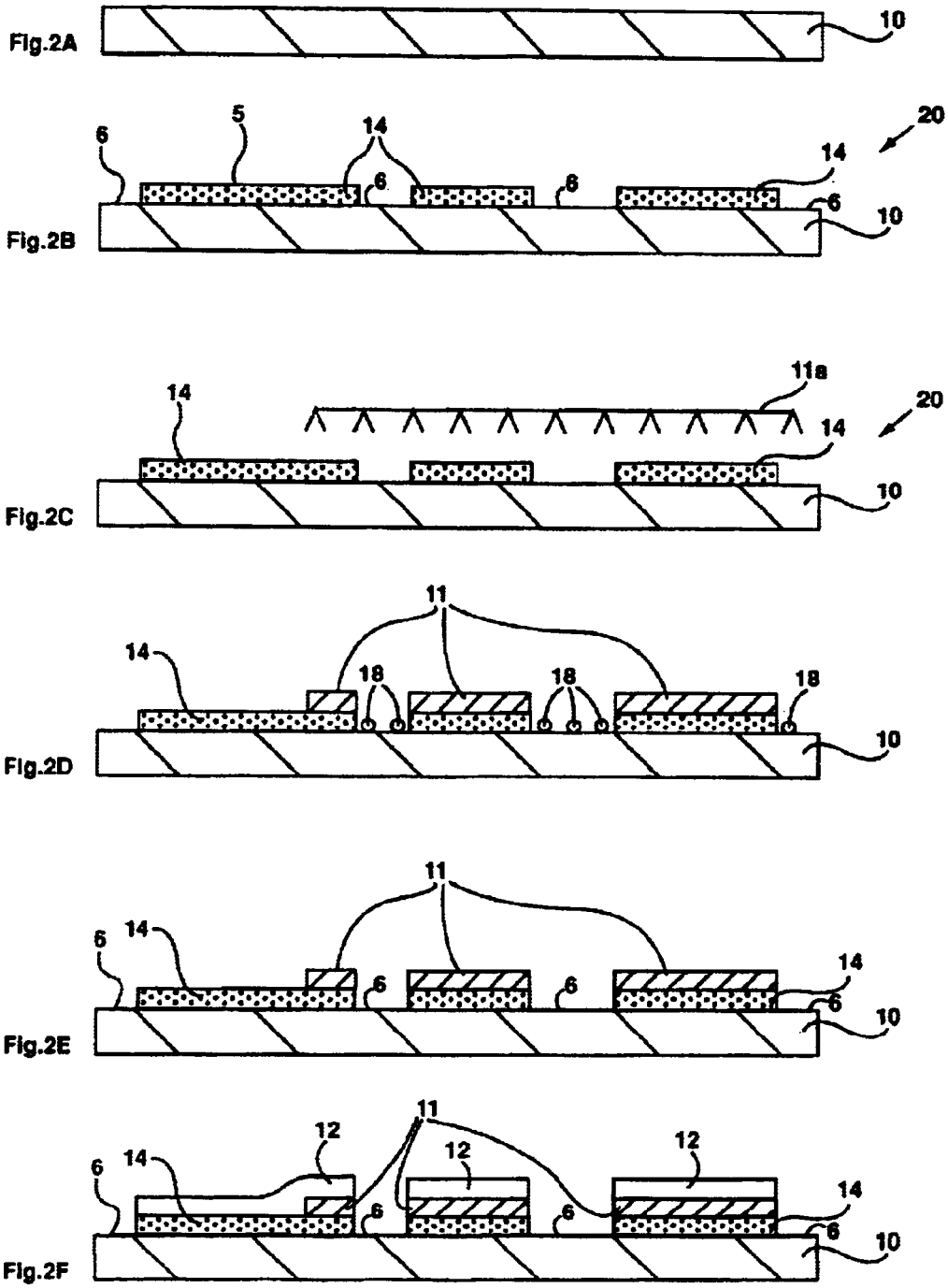
Figure 3A:
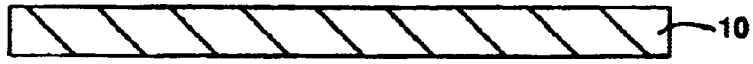
Figure 3B:
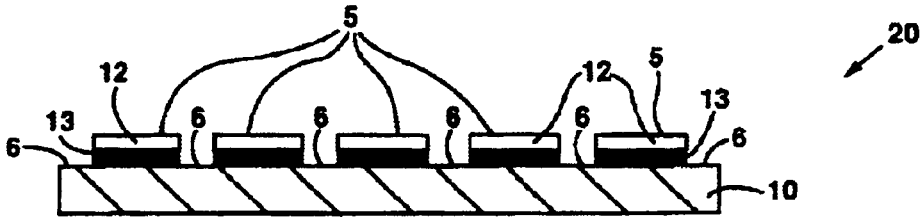
Figure 3C:
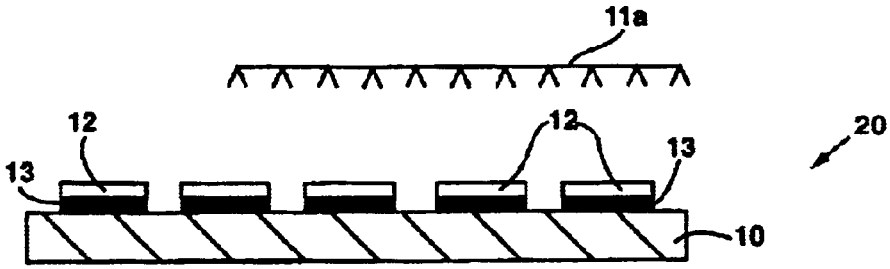
Figure 3D:
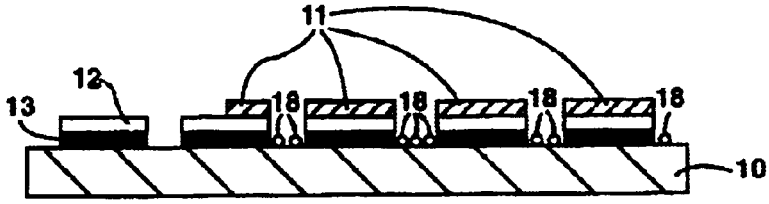
Figure 3E:
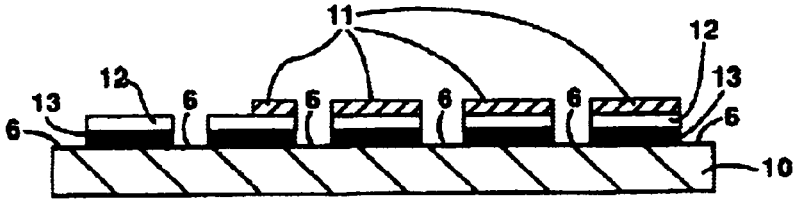

FIG. 1A illustrates substrate 10 to which print pattern 5 comprising image material 12 is applied, as illustrated in FIG. 1B, to form a patterned substrate. Substrate 10 may be any suitable material, for example, a polyester or polypropylene film. Image material 12 may be any suitable image material to which a UV-curable ink adheres, for example, a pvc solvent-based ink such as Coates VYNAGLAZE™, an ink manufactured by Coates Screen. The patterned substrate 20 has two outer edges and alternate printed portions 5 (forming the print pattern) and non-printed portions 6. As illustrated in FIG. 1C, the addressed design or design-generating medium 11a is then applied or addressed to the patterned substrate 20, the design-generating medium constituting UV-curable inkjet ink in this embodiment. The UV-curable inkjet ink is cured simultaneously with, or fractionally delayed by less than 1 second after, the impact of each ink deposit. As illustrated in FIG. 1D, upon UV curing, durable image material design layer 11 is formed on the image material 12 forming print pattern 5 over the width of the addressed design, and non-durable image material 18 lies on the non-printed portions within the width of the addressed design, which are portions to which the UV-curable inkjet ink does not adhere or does not have good adhesion. FIG. 1E illustrates the final product, after the non-durable image material 18 has been removed, e.g., by means which are known in the art (for example, by air-jetting).

FIGS. 2A-2E illustrate method steps that are similar to those illustrated in FIGS. 1A-1E, respectively. Substrate 10 and transparent material 14 forming print pattern 5 (together forming a patterned substrate 20) are transparent, and the durable image material design layer 11 is reverse printed using UV-curable ink such that it appears as a right-reading design when observed through transparent substrate 10 and transparent print pattern material 14. As illustrated in FIG. 2F, an overall layer of image material 12, typically white, is then applied over design layer 11 to provide a background to the design. The layer of image material 12 may be applied, for example, by applying ink using screenprinting or inkjet printing. The image material 12 is either not applied to the non-printed portions 6, or it is selected so as to be non-durable where applied to non-printed portions 6 such that it is easily removed from the non-printed portions 6, e.g., by air-jetting. Image material 12 may alternatively be pigmented resin that is transferred from a carrier film such as polyester film onto the patterned substrate by means of heated rollers. More than one layer of pigmented resin—for example, white and black layers—can be applied to form layer 12, either in separate layers or combined on a single carrier film to be transferred to the patterned substrate in a single pass.

FIGS. 3A-3E illustrate method steps that are similar to those illustrated in FIGS. 1A-1E, respectively. In the embodiment illustrated in FIGS. 3A-3E, however, the printed portions 5 include a white material layer 12 superimposed on a black material layer 13 with substantially exact registration using techniques known in the art. The print pattern can be formed of any number of superimposed layers. Superimposed layers of ink may be of similar type or may vary, for example black material layer 13 may be an ink that adheres well to substrate 10, for example Coates VYNAGLAZE™ and white material layer 12 may be different ink, for example Coates VYNALAM™ to which the design layer ink, for example Sericol Uvijet™, has good adhesion.

FIGS. 4A-4E illustrate method steps that are similar to those illustrated in FIGS. 3A-3E, respectively. In the embodiment illustrated in FIGS. 4A-4E, the printed portions 5 include a white layer 12 spaced within a black layer 13 using techniques known in the art. Design layer 11 includes a translucent, colored ink. When the panel is viewed from the side of design layer 11, the color of design layer 11 can be perceived where it lies over the white image material 12, but is substantially imperceptible where it lies directly on black marking material 13. In this and each of the previously described methods, the surface energy of the substrate 10 can be altered or adjusted as explained above to create differential adhesion between layers applied to print pattern 5 and areas 6 of substrate 10 outside the print pattern.

Figure 5:
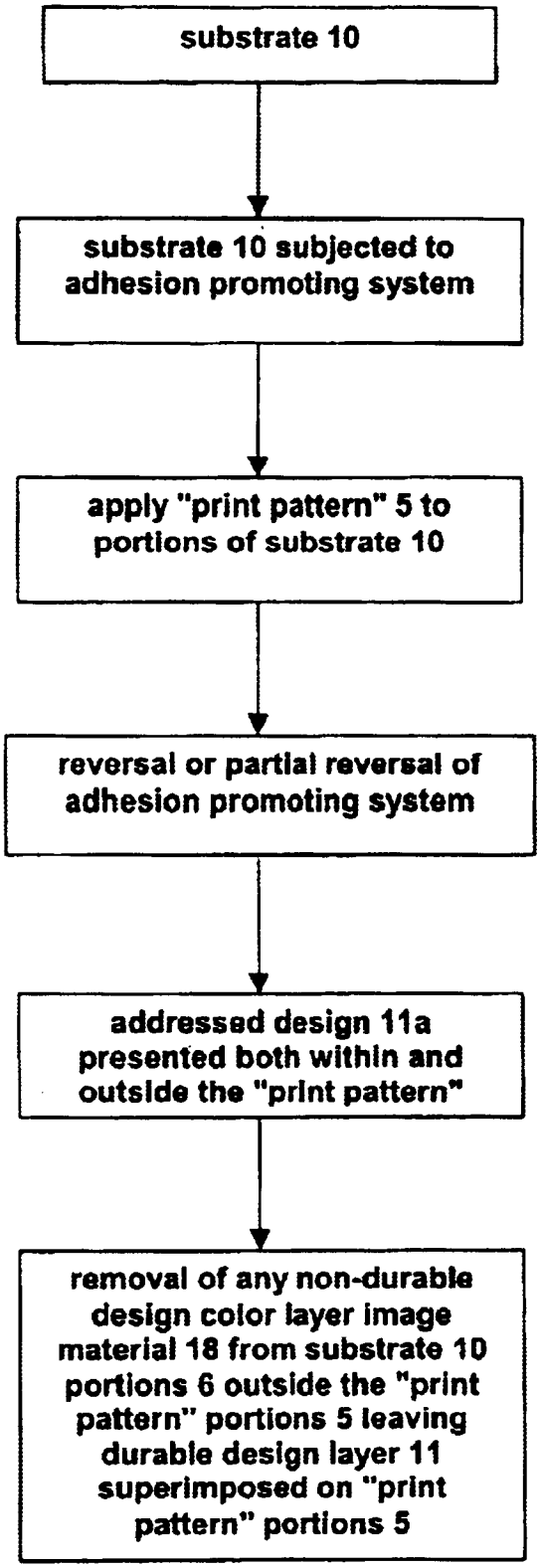
FIGS. 5-7 are flow charts listing steps in the various embodiments of methods according to the invention.

FIG. 5 is a flowchart of the method in which substrate 10 is first subjected to a "reversible" or "ephemeral" adhesion-promoting process such as corona treatment. The print pattern 5 is then applied in the form of a marking material onto substrate 10 to produce a patterned substrate. This is followed by reversal or partial reversal of the adhesion-promoting system. For example, the patterned substrate may be left for a period of time (which may be on the order of up to 10 weeks) to allow the surface energy, which has been raised by the corona treatment, to dissipate so that there is lower surface energy on the non-printed portions 6 of the substrate than on the printed portions 5. The addressed design layer 11a is then presented both within and outside the print pattern, for example, by inkjet printing using UV-curable inkjet ink and a digital printing machine. Finally, any non-durable design layer image material 18 located outside the print pattern portions 5 is removed from substrate 10, thus leaving durable image material design color layer 11 superimposed on the marking material of print pattern portions 5 in substantially exact registration.

Figure 6:
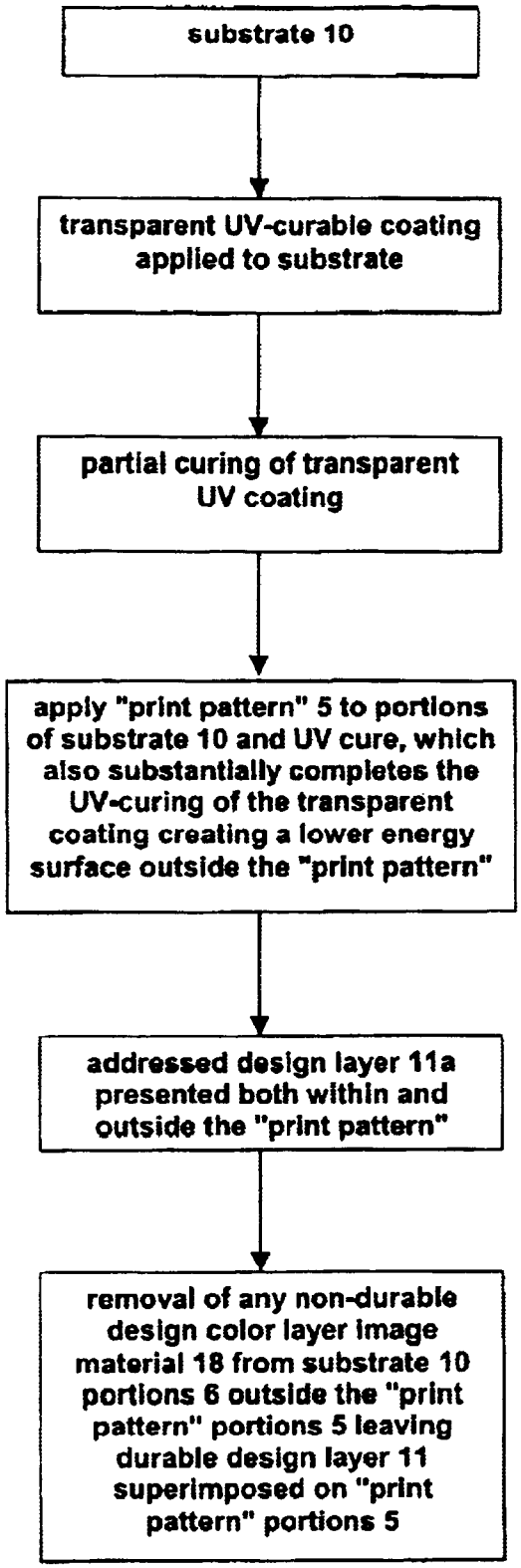

FIG. 6 is a flowchart of the method in which substrate 10 is first coated with a transparent, UV-curable ink or other UV-curable material such as clear, transparent Nor-Cote IGI ink, which is only partially cured, thereby enabling the subsequent application of marking material to form print pattern 5. The marking material of print pattern 5 is then partially UV-cured, which substantially fully cures the transparent coating and lowers its surface energy outside the print pattern. The addressed design layer 11a is then presented both within and outside the print pattern, for example, by printing using UV-curable inkjet ink and a digital printing machine. Finally, any non-durable design layer image material 18 that is located outside of the print pattern 5 is removed from substrate 10, thus leaving durable image material design color layer 11 superimposed on the marking material of print pattern portions 5 in substantially exact registration.

Figure 7:
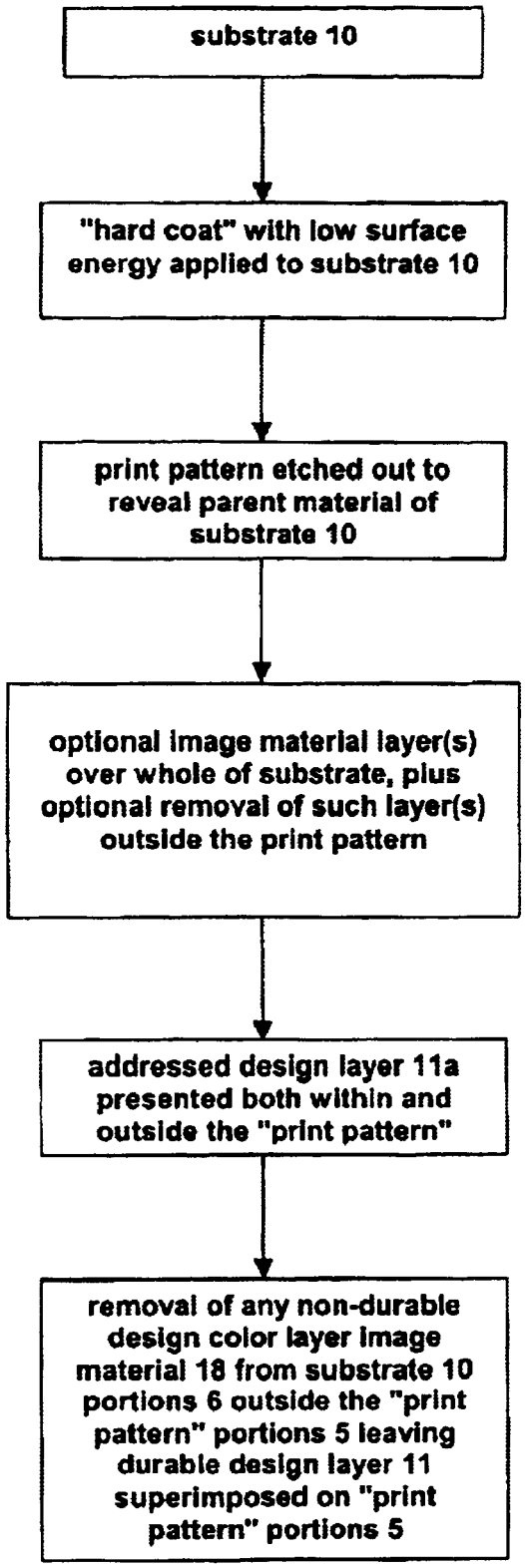

FIG. 7 is a flowchart of the method in which substrate 10 has applied to it a "hard coat" coating layer that has low surface energy, for example Lexan® Margard®. The print pattern is then etched out by removing portions of the hard coat coating layer so as to reveal the "parent" material of the substrate itself, which is ink-receptive. One or more optional image material layers may then be applied, which adhere to areas within the print pattern (i.e., areas where portions of the hard coat layer have been removed) but not to the portions of the hard coat layer that remain, i.e., the portions of the patterned substrate located outside the print pattern. Any such image material layers are removed from outside the print pattern either layer-by-layer or all together, for example by air- or water-jetting. The addressed design layer 11a is then presented both within and outside the print pattern, for example, by printing using UV-curable inkjet ink and a digital printing machine. Finally, any non-durable design layer image material 18 located outside the print patter portion 5 is removed from substrate 10, thus leaving durable image material design color layer 11 superimposed on the marking material of print pattern portions 5 in substantially exact registration.

Figure 8A:
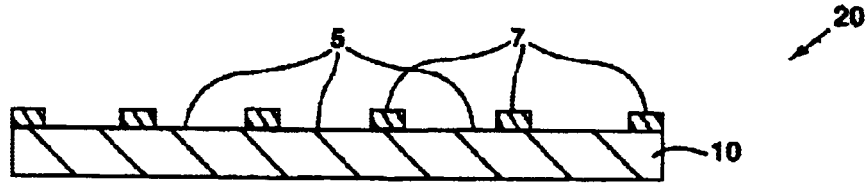
FIGS. 8 and 9 illustrate variants of the inventive method utilizing the "stencil" or "direct" methods of creating an ink fracture mechanism.
Figure 8B:
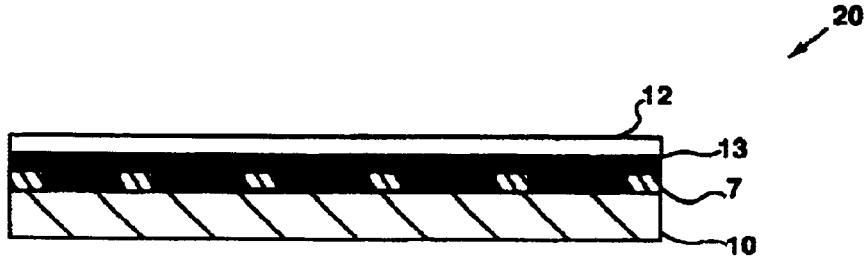
Figure 8C:
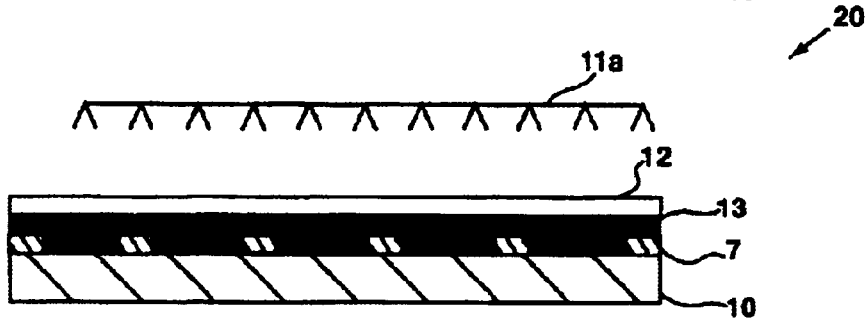
Figure 8D:
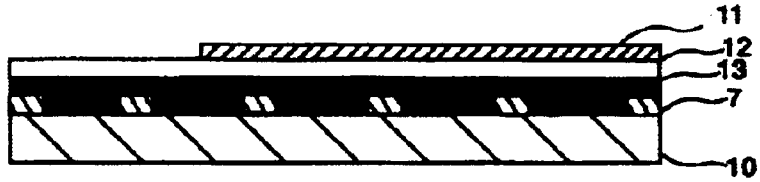
Figure 8E:
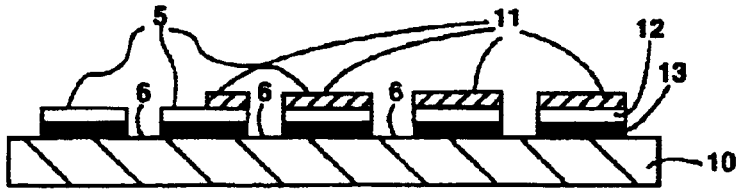

FIGS. 8A-8E illustrate method steps for the invention utilizing a stencil of the required print pattern. FIG. 8A illustrates substrate 10, for example a sheet of acrylic, pvc or polycarbonate, to which stencil material 7 is screenprinted, for example an organic, solvent-based printing ink normally used to print on paper or card materials. Print pattern 5 is exposed on substrate 10 within the boundaries of stencil 7. As illustrated in FIG. 8B, a solvent-based ink, for example Coates VYNAGLAZE™, is applied, for example by screenprint floodcoating, followed by background image layer 12, which could be the same type of ink (e.g., Coates VYNAGLAZE™) or a different ink with improved receptivity to the intended design layer ink (e.g., Coates VYNALAM™) also floodcoated by screenprinting. As illustrated in FIG. 8C, the addressed design or design-generating medium 11a is then applied or addressed to the patterned substrate 20, the design-generating medium constituting UV-curable inkjet ink in this embodiment, for example Sericol Uvijet™. FIG. 8D illustrates design layer 11 applied to background image layer 12. This imaged panel is then subjected to an ink removal process, e.g., high pressure water-jetting, which removes the stencil 7 and the ink layers above it, leaving ink layers 13, 12 and 11 superimposed in substantially exact registration over print pattern 5, leaving non-printed portion 6 outside the areas of print pattern 5, as illustrated in FIG. 8E.

Figure 9A:
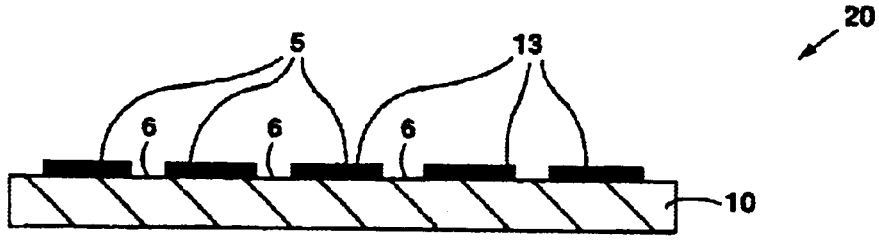
Figure 9B:
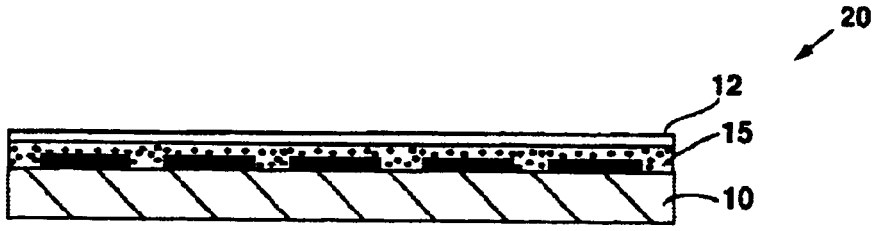
Figure 9C:
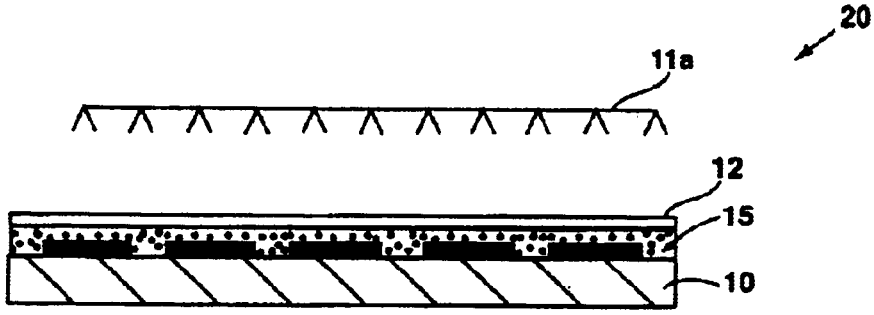
Figure 9D:
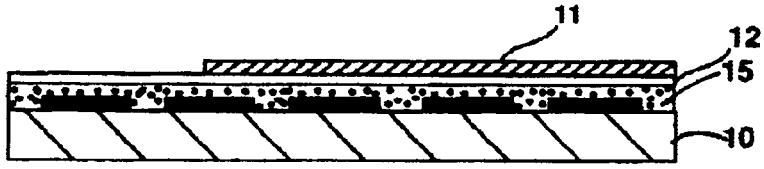
Figure 9E:
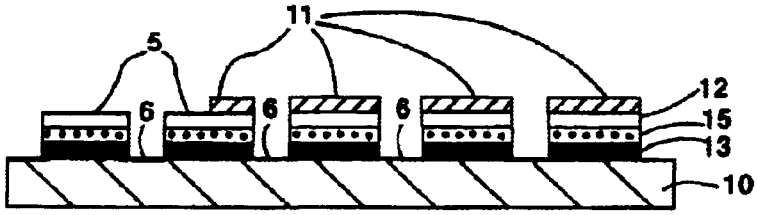

FIGS. 9A-9E illustrate method steps for the invention utilizing the "direct" method of superimposing layers in a required print pattern with substantially exact registration. FIG. 9A illustrates substrate 10, for example a sheet of acrylic, pvc or polycarbonate, to which image material 13 is screenprinted to form print pattern 5 and leaving areas 6 of substrate 10 outside the print pattern uncovered. Image material 13 can be a solvent-based pvc screenprinting ink such as Coates VYNAGLAZE™. As illustrated in FIG. 9B, an image material layer 15 is applied over all print pattern 5 and areas 6, for example by screenprint floodcoating. Image material layer 15 has good adhesion to image material 13 but not to substrate 10, a suitable ink being a cellulose based ink, otherwise normally used for printing paper or card. This is followed by background image layer 12, which could be the same type of ink or a different ink with improved receptivity to the intended design layer ink (e.g., Coates VYNALAM™) also floodcoated by screenprinting. As illustrated in FIG. 9C, the addressed design or design-generating medium 11a is then applied or addressed to the patterned substrate 20, the design-generating medium constituting UV-curable inkjet ink in this embodiment, for example Sericol Uvijet™. FIG. 9D illustrates design layer 11 applied to background image layer 12. This imaged panel is then subjected to an ink removal process, e.g., high pressure water-jetting, which removes the ink layers outside the print pattern by virtue of the poor bond of layer 15 to substrate 10, leaving ink layers 13, 15, 12 and 11 superimposed in substantially exact registration over print pattern 5, leaving non-printed portion 6 outside the areas of print pattern 5, as illustrated in FIG. 9E.

Figure 10A:
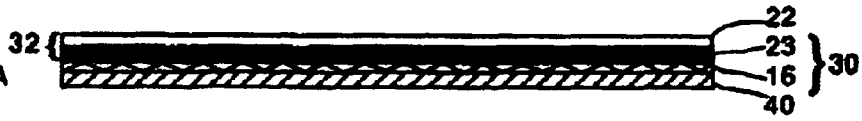
FIG. 10 illustrates the inventive method utilizing vinyl stripes to form a print pattern.
Figure 10B:
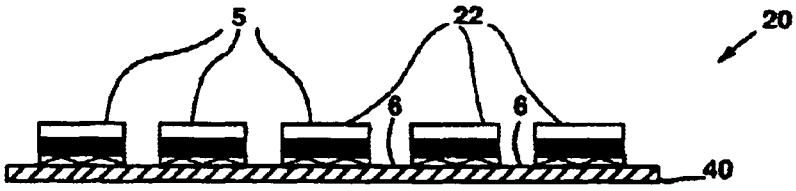
Figure 10C:
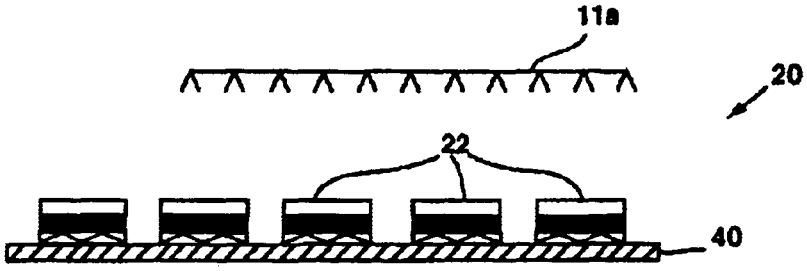
Figure 10D:
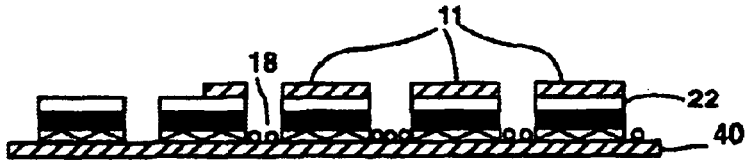
Figure 10E:
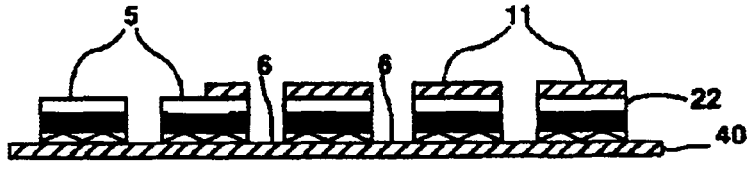
Figure 10F:
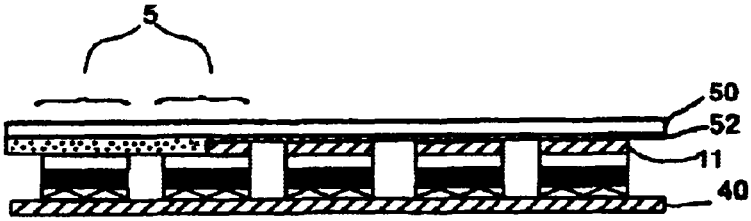
Figure 10G:
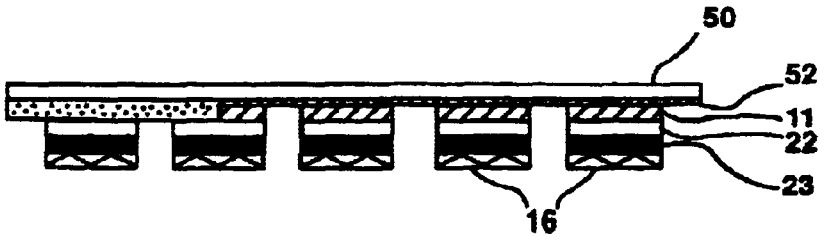
Figure 10H:
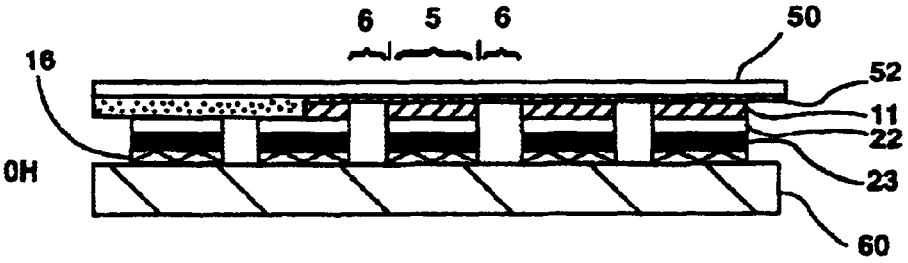

FIGS. 10A-H illustrate method steps for the invention utilizing self-adhesive vinyl stripes to form the print pattern. FIG. 10A illustrates self-adhesive vinyl assembly 30 which includes a facestock 32, typically a white vinyl layer 22 bonded to a black vinyl layer 23, which is adhered to temporary liner 40 typically comprising silicone-coated paper or polyester, by means of self-adhesive (pressure-sensitive adhesive) 16. The vinyl facestock 32 and self-adhesive layer 16 are "kiss-cut", for example by means of a slitting cylinder or X-Y plotter-cutter to form self-adhesive stripes on temporary liner 40 which acts as the substrate of the invention. The self-adhesive stripes form print pattern 5 with areas 6 of the temporary liner substrate 40 exposed outside the areas of the print pattern. As illustrated in FIG. 10C, the addressed design or design-generating medium 11a is then applied or addressed to the patterned substrate 20, the design-generating medium constituting UV-curable inkjet ink in this embodiment, for example Sericol Uvijet™. FIG. 10D illustrates design layer 11 applied to white layer 22. As illustrated in FIG. 10D, upon UV curing, durable image material design layer 11 is formed on the vinyl layer 22 within print pattern 5 over the width of the addressed design, and non-durable image material 18 lies on the portions 6 outside the print pattern and within the width of the addressed design, which are portions to which the UV-curable inkjet ink does not adhere or does not have good adhesion. FIG. 10E illustrates the patterned substrate, after the non-durable image material 18 has been removed, e.g., by means which are known in the art (for example, by air-jetting). The product of FIG. 10E forms a one-way vision panel in which design layer 11 is visible from one side and not visible from the other side, the other side providing good vision through transparent liner 40 and the gaps 6 between print pattern 5. Optionally, as illustrated in FIG. 10F, transparent overlaminate 50 is applied to the self-adhesive stripes forming print pattern 5 and the design layer 11 applied thereto, by means of transparent heat-activated adhesive 52. The temporary liner 40 is removed from the self-adhesive layer 16, as illustrated in FIG. 10G. The imaged self-adhesive stripes are then applied to a window by means of overlaminate 50, for example to form a one-way vision sign. From the overlaminate side, design layer 11 can be seen through transparent overlaminate 50 and through transparent heat-activated adhesive 52 but cannot be seen from the other side of the window 60. This embodiment of the invention provides good vision through window [70] *60* in the gaps 6 between the print pattern 5. When the sign is no longer required on window 60, the assembly shown in FIG. 10G can be removed in one piece from the window by virtue of the bond provided by adhesive 52 being greater than the bond to the window, provided by adhesive 16.

The embodiments described above are intended to be illustrative of the invention. Modifications to and departures from these embodiments are deemed to be within the scope of the following claims.

What is claimed is:

1. A method of making a printed panel comprising a substantially imperforate substrate and having a design printed thereon, the design comprising a durable image material design layer adhered to a print pattern which subdivides the substantially imperforate substrate into a plurality of discrete printed areas and/or a plurality of discrete non-printed areas, the method comprising: forming said print pattern on said substantially imperforate substrate to form a patterned substrate; [and] presenting a design-generating medium *com-*

*prising UV-curable ink* to the patterned substrate, *said presenting comprising digitally inkjet printing said UV-curable ink* to form an imaged substrate without regard to whether the design-generating medium is being presented to areas of the print pattern or to areas outside the print pattern; *and UV-curing the UV-curable ink into a UV-cured ink;* wherein the design-generating medium *and UV-curing* causes the durable image material design layer to be formed only within the print pattern [but] *and* not outside the print pattern, and wherein the design-generating medium causes [either (i) no image material to be formed on the areas outside the print pattern, or (ii)] only non-durable image material to be formed on the areas outside the print pattern[, which non-durable image material does not have good adhesion to the substantially imperforate substrate]; wherein, *after said UV-curing,* the durable image material design layer comprises UV-cured ink; and wherein non-durable image material is defined as material which can be [substantially] removed by water-jetting at a pressure of 2,000 lb/in$^2$ (140 kg/cm$^2$) with a water flow rate of 15 liters/minute and any durable image material [with good adhesion to the substrate] will remain [substantially] not removed by water-jetting at a pressure of 2,000 lb/in$^2$ (140 kg/cm$^2$) with a water flow rate of 15 liters/minute, *wherein said substantially imperforate substrate is coated with a UV-curable material, said UV-curable material is partially cured, image material is applied to form said print pattern, and said image material is partially cured and said UV-curable material is fully cured.*

2. A method as claimed in claim 1, wherein said print pattern comprises a material which is *first* applied to the *substantially imperforate* substrate and which has a higher surface energy than the surface energy of the *substantially imperforate* substrate outside the print pattern.

[3. A method as claimed in claim 1, wherein said print pattern comprises a material applied to the substrate and having good adhesion to the substrate and wherein any material outside the print pattern does not have good adhesion to the substrate.]

[4. A method as claimed in claim 1, wherein said UV-curable ink is digitally printed by an inkjet printer.]

5. A method as claimed in claim [4] *1*, wherein*:*

*said presenting comprises digitally inkjet printing said UV-curable ink using an inkjet printer; and* said inkjet printer utilizes piezoelectric inkjet nozzles.

6. A method as claimed in claim [4] *1*, wherein a time delay is [provide] *provided* between contact of said UV-curable ink with said patterned substrate and the [application of] UV-curing [regime to cure said UV-curable ink].

7. A method as claimed in claim [4] *1*, wherein said ink is preheated to a temperature not less than 25° C.

8. A method as claimed in claim 7, wherein said ink is cooled before or upon contact with said *substantially imperforate* substrate.

9. A method as claimed in claim 1, wherein said *substantially imperforate* substrate is pre-treated prior to the application of said print pattern to increase its surface energy.

10. A method as claimed in claim 9, wherein said [wherein said] *substantially imperforate* substrate is pre-treated using a corona surface treatment comprising an electrical discharge.

11. A method as claimed in claim 10, wherein said corona surface treatment raises the surface energy of said *substantially imperforate* substrate to above 40 dynes/cm$^2$, and wherein said *substantially imperforate* substrate is printed with said print pattern, and wherein said surface energy subsequently dissipates with time to less than 35 dynes/cm$^2$ [such that said UV-curable ink adheres well to said print pattern but said UV-curable ink does not adhere well to said substrate].

12. A method as claimed in claim 1, wherein said non-durable image material is removed by jetting with a [substantially non-aqueous] fluid.

13. A method as claimed in claim 12, wherein said fluid comprises air.

14. A method as claimed in claim 12, wherein said fluid comprises [air with a particulate abrading medium] an *abrading medium comprising air and a particulate material*.

15. A method as claimed in claim 12, wherein said fluid comprises solvent-based liquid.

16. A method as claimed in claim 1, wherein said non-durable [marking] *image* material is removed using means of adhesion.

17. A method as claimed in claim 16, wherein said means of adhesion comprises the application and removal of a self-adhesive film to said imaged substrate.

18. A method as claimed in claim 16, wherein said means of adhesion comprises a liquid layer which cures to adhere to the surface of the image material to form an adhered layer, which adhered layer is subsequently removed together with said non-durable image material attached to said adhered layer.

19. A method as claimed in claim 1, wherein said *substantially imperforate* substrate is transparent.

20. A method as claimed in claim 1, wherein said print pattern comprises a white layer of image material.

21. A method as claimed in claim 1, wherein said print pattern comprises a black layer of image material superimposed with a white layer of image material.

22. A method as claimed in claim 1, wherein said print pattern comprises a clear material.

[23. A method as claimed in claim 22, wherein said clear material is transparent.]

24. A method as claimed in claim 1, wherein the design layer comprises a design color layer and wherein said design color layer does not extend over the whole of the print pattern.

[25. A method as claimed in claim 1, wherein said substrate is coated with a UV-curable material, said UV-curable material is partially cured, image material is applied to form said print pattern, and said image material is partially cured and said UV-curable material is substantially fully cured.]

[26. A method as claimed in claim 1, wherein said substrate is coated with a coating having a surface energy less than 30 dynes/cm$^2$ and portions of said coating are removed by etching from the areas of the print pattern to reveal the substrate.]

[27. A method as claimed in claim 26, wherein said etching is chemical etching.]

[28. A method as claimed in claim 26, wherein said etching is by means of a laser.]

29. A method as claimed in claim 1, wherein the non-durable image material is [substantially] removed from the areas of the patterned substrate outside the print pattern by the application of an abrading medium under pressure at a rate of less than 10 kg per minute.

30. A method as claimed in claim 1, wherein the non-durable image material is [substantially] removed from the areas of the patterned substrate outside the print pattern by the application of an abrading medium under pressure at a rate of less than 5 kg per minute.

31. A method as claimed in claim 1, wherein the non-durable image material is [substantially] removed from the areas of the patterned substrate outside the print pattern by the application of an abrading medium under pressure at a rate of less than 2 kg per minute.

[32. A method as claimed in claim 1, wherein said print pattern is formed using self-adhesive vinyl stripes.]

[33. A method as claimed in claim 32, wherein said self-adhesive vinyl stripes are imaged with said design layer comprising UV-curable ink, and wherein an overlaminate is applied to said design layer by means of heat-activated adhesive.]

[34. A method as claimed in claim 33, wherein the self-adhesive vinyl stripes are applied to a window, and wherein the adhesion of the overlaminate to the design layer is greater than the adhesion of the self-adhesive vinyl stripes to the window.]

*35. A method of making a printed panel comprising a substantially imperforate substrate, a background color layer, and a design comprising a design layer, the method comprising:*

*forming said background color layer directly on the substrate, wherein the background color layer defines a print pattern that subdivides the substantially imperforate substrate into a plurality of discrete printed areas and/or a plurality of discrete non-printed areas, wherein forming said background color layer comprises digital inkjet printing UV-curable ink;*

*digital inkjet printing said design layer onto the print pattern after forming the background color layer, wherein printing said design layer comprises digital inkjet printing UV-curable ink; and*

*UV-curing the UV-curable ink of the design layer and the UV-curable ink of the background color layer.*

*36. A method as claimed in claim 35, wherein said substantially imperforate substrate is transparent.*

*37. A method as claimed in claim 35, wherein said forming of said background color layer comprises forming a black material layer of said UV-curable ink directly on the substrate and a white material layer superimposed on the black material layer.*

*38. A method as claimed in claim 35, wherein said UV-curable ink of the background color layer comprises white UV-curable ink.*

*39. A method as claimed in claim 35, wherein said UV-curable ink of the background color layer comprises a layer of black UV-curable ink and a layer of white UV-curable ink.*

*40. A method of making a printed panel comprising a substantially imperforate substrate, a print pattern, a background color layer, and a design comprising a design layer, the method comprising:*

*digital inkjet printing said print pattern comprising UV-curable ink directly onto the substrate, wherein the print pattern subdivides the substantially imperforate substrate into a plurality of discrete printed areas and/or a plurality of discrete non-printed areas;*

*digital inkjet printing said design layer over the print pattern after printing said print pattern to form said design layer on said print pattern, wherein the design layer comprises UV-curable ink;*

*digital inkjet printing said background color layer after printing said design layer to form said background color layer on said print pattern, wherein said background color layer comprises UV-curable ink; and*

*UV-curing the UV-curable ink of the print pattern, the design layer, and the background color layer.*

*41. A method as claimed in claim 40, wherein said substrate and said print pattern are transparent.*

*42. A method as claimed in claim 41, wherein said design layer is reverse printed such that it appears as a right-reading design when observed through said transparent substrate and said transparent print pattern.*

*43. A method as claimed in claim 40, wherein said design and background layers are not applied to said non-printed areas.*

*44. A method as claimed in claim 40, wherein one of said design layer or said background color layer are applied to both of said printed areas and non-printed areas and removed from said non-printed areas.*

*45. A method as claimed in claim 40, wherein said UV-curable ink of the background color layer comprises white UV-curable ink.*

*46. A method as claimed in claim 40, wherein said UV-curable ink of the background color layer comprises a layer of white UV-curable ink and a layer of black UV-curable ink.*

* * * * *